P. Manny,
Mower.

No. 16984. Patented April 7. 1857

UNITED STATES PATENT OFFICE.

PELLS MANNY, OF WADDAM'S GROVE, ILLINOIS.

IMPROVEMENT IN HARVESTERS.

Specification forming part of Letters Patent No. 16,984, dated April 7, 1857.

*To all whom it may concern:*

Be it known that I, PELLS MANNY, of Waddam's Grove, in the county of Stephenson and State of Illinois, have invented a certain new and useful Improvement in Harvesters, of which the following is a full, clear, and exact description, reference being had to the accompanying drawings, which form part of this specification, and in which—

Figure 1:
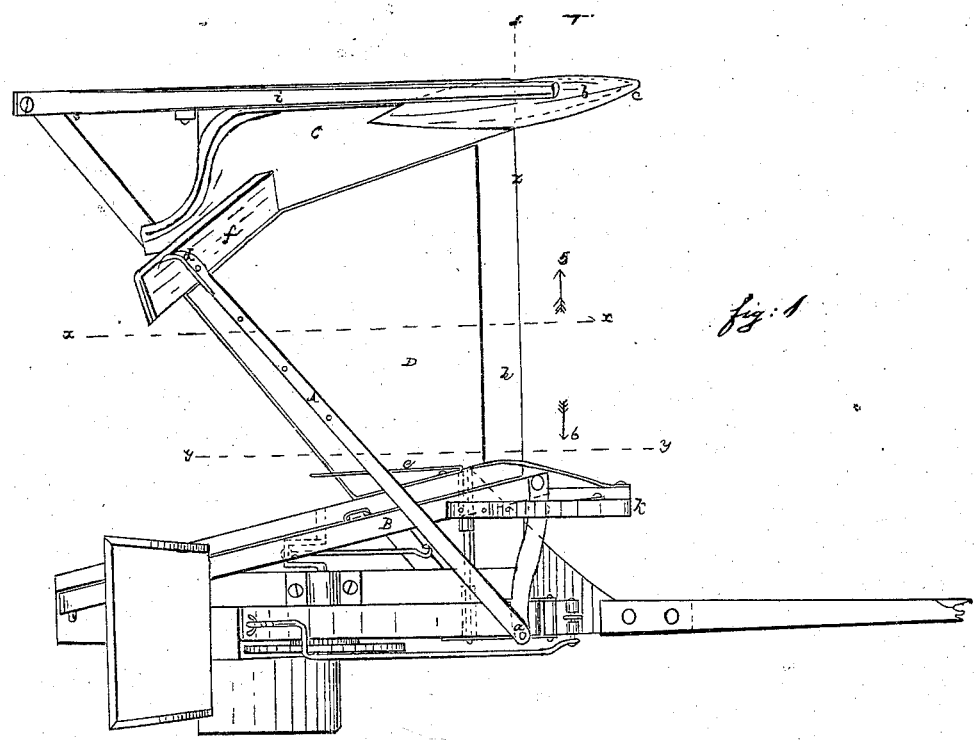
Figure 2:
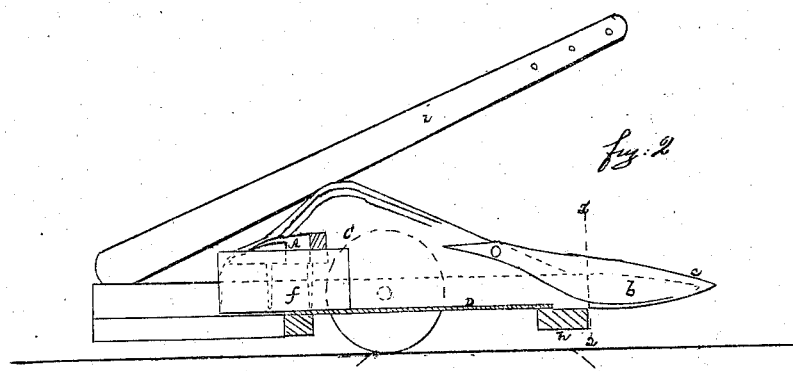
Figure 4:

Figure 1 represents a plan or top view of the machine in part; Fig. 2, a vertical section taken through the line $x\,x$ and looking in direction of the arrow 5; and Fig. 3, a similar section through the line $y\,y$, looking in direction of the arrow 6; and Fig. 4 is a transverse section of the divider and its sheath, taken as indicated by the line $z\,z$.

The nature of my invention consists in the combination of a peculiarly-constructed elastic metallic sheath connecting the divider with the main wing of the platform, with a hook or its equivalent attached to the outer end of the rake-head, for operation together, as hereinafter described.

As the present improvement is connected with the operation of an automatic rake the travel or swing of which is from front to rear of the machine in effecting the delivery, I have here represented that patented to me on November 4, 1856.

This rake has its head A pivoted at its one end by a pin, $a$, to an up-and-down-moving supporting-beam, B, which beam and rake-head are so operated as that the rake sweeps across the platform back and forth in a curvilinear direction in close relationship to the platform in moving from front to back and at some distance from or above it on returning.

The pointed divider $b$ on the inner side of the machine in front, that gathers and separates the grain, which is made, say, of wood, I cover or sheath over its top and on its inner side—that is, its side next to the rake—with a thin elastic metal scroll-cap, $c$, which extends onto or against the main wing C of the harvester on its inner side, and is made of such form or configuration that a hook, $d$, on the end of the rake will, in the operation of the rake, sweep close and clean, and over or along it, so as to clear said divider at each action of the rake of any cut grain or particles lying there, and this the smooth surface of the metallic sheath $c$, made in one piece, enables the hook $d$ to effect, which a divider made of wood and in several pieces, to give it the proper form for the close action of the hook $d$ over it, would not effect, as the joints of the several pieces would open by the racking of the machine and hold the grain or cut particles, while a solid wooden divider of the necessary form would be a difficult thing to make; but by employing a thin metal sheath, $c$, the same may be easily bent when in place to accord with the path described by the hook, the sheath lapping loose or being larger than the wood support to its interior on the platform side of it and on its top for this purpose, as represented in Fig. 4, and a perfectly smooth surface for the action of the hook $d$ on and over or along it is secured without any material increase of weight. Thus is clogging or catching of the grain at this point or portion avoided, and the rake works close up to a smooth interior lining in front at its end, and will of necessity at each delivery stroke easily remove any cut grain or particles lying there. Where a hand-rake is used this is not so important, as the raker can readily make an extra movement to remove grain lodging about the divider; but this facility is not afforded an automatic rake which has prescribed or certain positive movements, and if all lodgment be not removed at each regular stroke of the rake accumulation taking place interferes with the action of the rake, as well as that of the sickle and duty of the divider. This smooth sheath or scroll-cap $c$, whose form accords with the traverse of the end of the rake for operation with it, is essentially different from the heavy rigid cast-iron dividing-shoe patented to W. A. Wood on the 24th of June, 1856, both as regards form and purpose for which it is intended. The curved projecting end of the rake or hook $d$, which works in connection with the metal cap or sheath $c$ of the divider, it should be observed, is of reversed hook form, whereby it rides more readily along and over the sheath $c$ without injury to or entanglement with such standing grain as may lean over its path, said hook in its return or forward stroke gently pushing such grain away to one side of it, and in the delivery-stroke of the rake said hook preventing the cut grain or particles which it gathers from off the divider or sheath $c$ from being thrown outward to accumulate, and insuring the positive delivery or removal of them each back-stroke of the rake, while the form of the hook generally is the best for easy and close contact with the smooth sheath or cap $c$ of the divider, and connecting the divider with the main wing C.

At the narrow side of the platform D, the side next to the draft, attached at its front end to the frame, is an elastic plate or guide, $e$, that, in conjunction with a sloping rigid guide-board, $f$, branching from the main wing C on its interior, contracts the delivery end or back edge of the platform, which contraction is no new thing; but I adopt this arrangement the better to secure tall grain lying on the platform from being caught by the stubble in the rear and drawn off the platform while the rake is moving forward, or in anticipation of the rake's delivery action, tall grain being readily caught by the stubble at the narrow end or side of the platform, and by the spring and rigid guides $e\ f$ on opposite sides of the platform, and the guide $f$ at the wide side being set converging backwardly toward the line of draft from the main wing at the delivery edge of the platform. This arrangement effectually accomplishes the desired result, the spring-guide $e$ serving to turn the grain onto the wider part of the platform, and the abrupt converging guide $f$ on the opposite side, and at the delivery edge crowding or turning the grain in a firm and positive manner against the spring-guide $e$, and the abrupt turn and partial stop or slower delivery movement which the grain thus gets on the back movement of the rake, without materially affecting the easy movement of the rake on the early portion of its delivery stroke, insures the collection of the grain into a close gavel just previous to delivery, while the spring-guide $e$ eases strainage and insures a free discharge, and the gavel, instead of being thrown off by the rake against the back portion of the framing of the machine on the draft side and scattered by coming in contact therewith, is, by the abrupt turn given it by the fixed guide $f$, in connection with the elastic action of the spring-guide $e$, turned and delivered free from any such contact.

Figure 3:
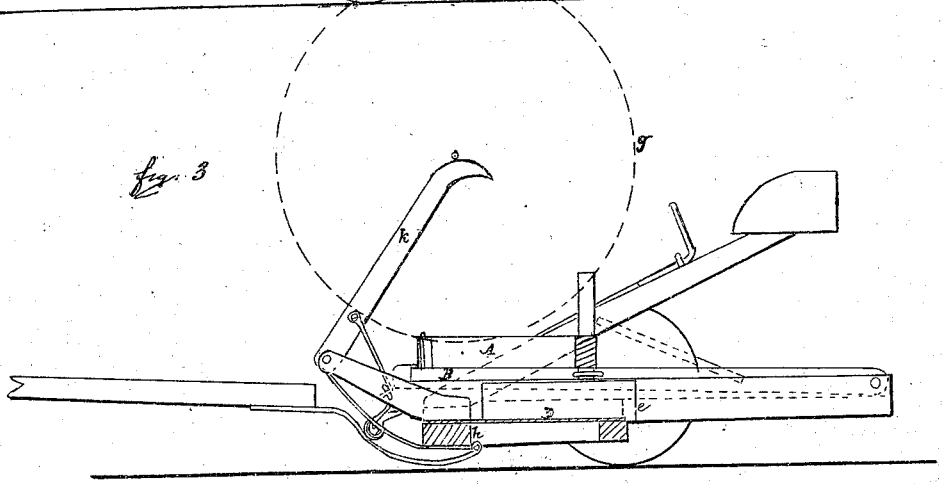

To enable the rake to work under the reel, which is represented by the circle $g$ in Fig. 3, for clearance of grain or cut particles from and along the sheath $c$ of the divider, as before specified, and from and off the sickle in front of the finger-bar $h$ to carry off short grain which fails to reach the platform, I support the reel on the inner side of the machine on an ordinary bar, $i$, inclining upward forwardly from the back of the machine, and sustain the reel on the draft side on an arm or elbow, $k$, attached at its lower end to a projection from the main frame in advance of the space which the sickle usually occupies, and make said arm $k$ to curve backwardly at its top over the play of the rake, and to a point above, over, or in rear of the finger-bar, whereby the reel may be hung in its ordinary or proper operative position, and the rake be allowed its free play under the reel, along the divider, and over the sickle and finger-bar, as and for the purposes above and before specified.

What I claim as new and useful, and desire to secure by Letters Patent, is—

The combination of the smooth elastic metal cap or sheath $c$, connecting the divider $b$ with the main wing C, with the reversed hook or bent projecting end $d$ of an automatic rake, when said parts are constructed and arranged for joint operation, essentially in the manner and for the purposes set forth.

In testimony whereof I have hereunto subscribed my name.

P. MANNY.

Witnesses:
 GEORGE PURINTON,
 L. B. CHRIST.